United States Patent
Datar et al.

(10) Patent No.: US 8,700,639 B1
(45) Date of Patent: *Apr. 15, 2014

(54) RANK-ADJUSTED CONTENT ITEMS

(75) Inventors: Mayur Datar, Santa Clara, CA (US); Kedar Dhamdhere, Sunnyvale, CA (US); Ashutosh Garg, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 85 days.

This patent is subject to a terminal disclaimer.

(21) Appl. No.: 13/486,776

(22) Filed: Jun. 1, 2012

Related U.S. Application Data

(63) Continuation of application No. 12/533,557, filed on Jul. 31, 2009, now Pat. No. 8,195,637, which is a continuation of application No. 11/694,268, filed on Mar. 30, 2007, now Pat. No. 7,610,282.

(51) Int. Cl.
 *G06F 17/30* (2006.01)
(52) U.S. Cl.
 USPC ........... 707/748; 707/708; 707/732; 707/758; 707/768
(58) Field of Classification Search
 USPC .................................. 707/708, 768
 See application file for complete search history.

(56) References Cited

U.S. PATENT DOCUMENTS

| | | | |
|---|---|---|---|
| 7,124,129 B2 | 10/2006 | Bowman et al. | |
| 7,194,454 B2 | 3/2007 | Hansen et al. | |
| 7,472,119 B2 | 12/2008 | Dai et al. | |
| 7,953,746 B1 | 5/2011 | Garg et al. | |
| 8,126,874 B2 * | 2/2012 | Sercinoglu et al. | 707/721 |
| 2006/0136377 A1 | 6/2006 | Patt-Shamir et al. | |
| 2006/0288000 A1 | 12/2006 | Gupta | |

* cited by examiner

*Primary Examiner* — Debbie Le
(74) *Attorney, Agent, or Firm* — Fish & Richardson P.C.

(57) ABSTRACT

Methods, systems, and apparatus, including computer programs encoded on a computer storage medium, for determining a context of the current search session. In one aspect, a method includes identifying query paths from previous search sessions, each query path defining a context and being a plurality of queries in an order in which the queries were provided for in a respective previous search session; identifying search session queries of a current search session; comparing the search session queries of the current search session to the queries in the query paths from the previous search sessions; and determining that a context of the current search session is related to a query path from the previous search sessions based at least in part on the comparison, the determining including: determining that two or more of the queries of the query path are similar to two or more of the search session queries.

20 Claims, 7 Drawing Sheets

RANK-ADJUSTED CONTENT ITEMS

CROSS REFERENCE TO RELATED APPLICATION

This application is a continuation of U.S. application Ser. No. 12/533,557, titled "Rank-Adjusted Content Items," and filed on Jul. 31, 2009 (now U.S. Pat. No. 8,195,637), which is a continuation of U.S. application Ser. No. 11/694,268, titled "Rank-Adjusted Content Items," and filed on Mar. 30, 2007 (now U.S. Pat. No. 7,610,282), the entire disclosures of each are incorporated herein by reference.

BACKGROUND

This disclosure relates to identifying content items.

Content items, e.g., video and/or audio files, web pages for particular subjects, news articles, etc., can be identified by a search engine in response to a query. The query can include one or more search terms, and the search engine can identify and rank the content items based on the search terms in the query. Typically the content items are displayed according to the rank.

The content items, however, are often identified only in response to a particular query, i.e., the search engine may identify and rank content items independently for each query. For example, for three different queries, the search engine may return a particular identification and rank of content items for each particular query, regardless of the other queries. In such implementations, a particular content item that may be highly relevant to a user's current interests may not be identified and/or highly ranked and presented to the user until the user has conducted multiple searches. Additionally, other users may experience similar challenges when searching for content.

SUMMARY

Disclosed herein are systems and methods of identifying content items. In one implementation, click logs and query logs are processed to identify statistical search patterns based on the click logs and query logs. A search session is compared to the statistical search patterns. Content items responsive to a query of the search session are identified, and a ranking of the content items is adjusted based on the comparison.

In another implementation, query paths and content terminuses associated with query paths are identified. Additionally, a context of a search session is identified and a determination of whether the context is related to one or more of the query paths is made. Content items responsive to a query of the search session are identified based on the determination.

In another implementation, a system includes a mining engine and an adjusting engine. The mining engine mines click logs and query logs to identify query paths and content terminuses associated with the query paths. The adjusting engine adjusts a ranking of content items responsive to a search session query based on the identified query paths and content terminuses.

In another implementation, identification of a context of a search session facilitates the adjusting of a ranking of one or more content items in response to a search session query. The adjustment can, for example, be based on the likelihood that a current user is searching for the rank-adjusted content items because a statistically significant number of prior users that exhibited a similar behavior to the current user selected the rank-adjusted content items.

DETAILED DESCRIPTION

Figure 1:
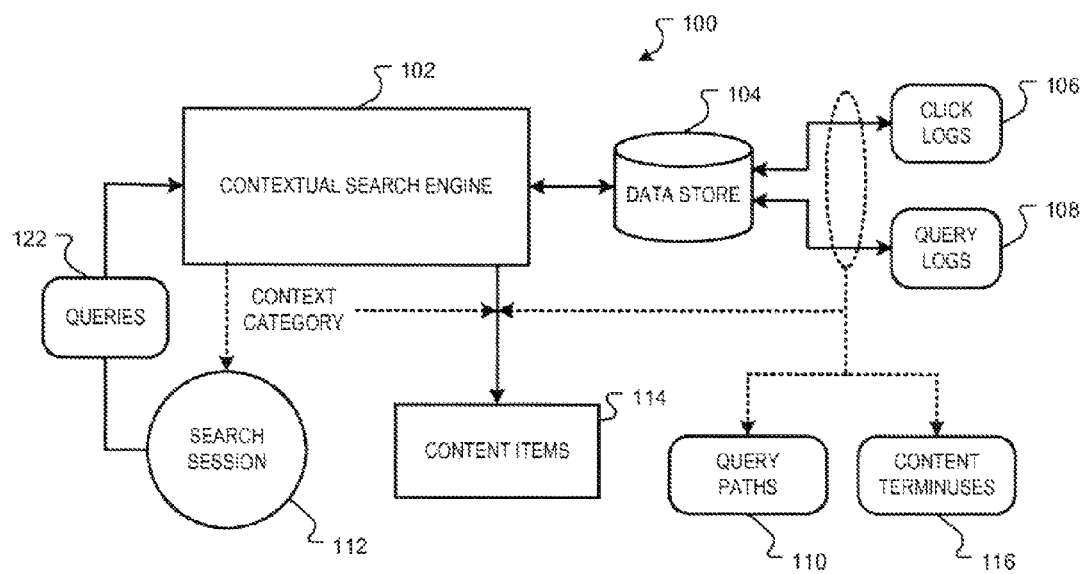
FIG. 1 is a block diagram of an example content identification system.

FIG. 1 is a block diagram of an example content identification system 100. The content identification system 100 can, for example, be implemented in a computer device or one or more computer devices connected through a network, e.g., a local area network (LAN) or a wide area network (WAN), such as the Internet. The one or more computing devices can, for example, include memory devices storing processing instructions and processing devices for executing the processing instructions. An example computing system is shown and described with reference to FIG. 12. Other implementations, however, can also be used.

The content identification system 100 can, for example, include a contextual search engine 102 and a content data store 104. In one implementation, the content data store 104 can comprise a unitary data store, such as a hard drive. In another implementation, the content data store 104 can comprise a distributed data store, such as a storage system that is distributed over a network. Other implementations, however, can also be used.

The search engine 102 can receive queries for search results and retrieve relevant search results from an index of documents (e.g., from an index of web pages). Search results can include, for example, lists of web page titles, snippets of text extracted from those web pages, and hypertext links to those web pages, and may be grouped into a predetermined number of (e.g., ten) search results. The search results can, for example, be ranked by a quality measure and a relevance measure. For example, a particular web page can have a quality measure derived from the number of other web pages that are linked to the particular web page, and can have an information retrieval score related to the matching the query terms to words in the particular web page. The information retrieval score can be combined with the page rank to give a final rank to the particular web page.

In one implementation, the content data store 104 can, for example, store click logs 106 and query logs 108 that comprise data related to previous search session queries. Different types of query logs 106 and click logs 108 can be identified.

In one implementation, the query logs 106 can store queries submitted by users, and the click logs 108 can identify content items 114 retrieved in response to the queries.

The contextual search engine 102 can, for example, process the click logs 108 and the query logs 106 to identify query paths 110. In one implementation, a query path 110 can include, for example, a series of queries in a particular order provided by users. In another implementation, a query path 110 can include, for example, a set of common queries provided by users that may define a particular order or a permutation of the particular order. Other query paths 110 types can also be used.

In one implementation, the query paths 110 can be defined by the similar or same sets of queries received from a statistically significant number of users that selected a same content item. In another implementation, the query paths 110 can be defined by the similar or same sets of queries received from a statistically significant number of users that selected a content item from a set of identified content items. Other statistical events can be used to define the query paths 110.

In one implementation, the contextual search engine 102 can, for example, identify the query paths 110 by identifying content terminuses 116, e.g., the terminus of a query path 110 that corresponds to an eventual selection of a content item 114, such as web page associated with a URL.

A content terminus 116 can be defined by the click logs 108 and be associated with one or more query paths 110. In one implementation, a content terminus 116 can, for example, be a content item 114, e.g., a web page associated with a URL. Accordingly, the associated query paths 110 can define queries that were submitted prior to an eventual selection of the content item 114.

In another implementation, a content terminus 116 can define an association of one or more query paths 110 with one or more content items 114, e.g., web pages. For example, the content terminus 116 can be implanted as a node that associates one or more query paths 110 with one or more content items 115. Accordingly, one or more query paths 110 can be associated with one or more content items 114 through a content terminus 116.

In one implementation, a search context of a search session 112 can be identified and compared to the query paths 110. The comparison can, for example, be utilized to adjust a ranking of one or more content items 114 responsive to a search query, such as a search query 122. For example, a search context can be defined by queries of a particular search session 112, and the contextual search engine 102 can determine whether one or more of the search session queries relate to an identified query path 100. The search context can thus be determined to correspond to an identified query path 110 that is associated with a content item 114. Accordingly, the content item 114 associated with the identified query path 110 can be ranked higher in response to a search query, e.g., search query 122, considered in the search context than when the query is considered absent of any context. The ranking adjustment of the content item 114 according to the search context is based on observation that prior users that exhibited a similar behavior selected the rank-adjusted content item 114.

For example, if a statistically significant number of users submit at least the set of queries "orange," "banana," and "pineapple" during a search session, and then click through to the website defined by a first address, e.g., FRUITURL1, the contextual search engine 102 can identify the first address FRUITURL1 as a content terminus 116 for the query path defined by the queries "orange/banana/pineapple" or a permutation of the queries "orange/banana/pineapple." Thereafter, the contextual search engine 102 can compare a context of another search session, e.g., a context defined by the queries "banana," "apple" and "pineapple" with the query path "orange/banana/pineapple." Based on the comparison, the contextual search engine 102 can determine that the search session context is related to the query path "orange/banana/pineapple" and adjust the ranking, e.g., increase the ranking, of the content item FRUITURL1 as it is associated with the query path "orange/banana/pineapple." The ranking adjustment thus reflects that a statistically significant number of prior users that exhibited a similar behavior to the current user performing the search also selected FRUITURL1.

In another implementation, one or more query paths 110 can be associated with the same content terminus 116. For example, if a statistically significant number of users submit the queries "orange," "banana," and "pineapple" during a search session, and then click through to the website defined by a first address, e.g., FRUITURL1, the contextual search engine 102 can identify the first address FRUITURL1 as a content terminus 116 for the query path defined by the queries "orange/banana/pineapple" or a permutation of the queries "orange/banana/pineapple." Likewise, if a statistically significant number of users submit the queries "mango," "kiwi," and "watermelon" during a search session, and then click through to the website defined by the first address, e.g., FRUITURL1, the contextual search engine 102 can identify the first address FRUITURL1 as a content terminus 116 for the query path defined by the queries "mango/kiwi/watermelon" or a permutation of the queries "mango/kiwi/watermelon." Accordingly, if the contextual search engine 102 determines that the search session context is related to either of the query paths, then the ranking of the content item FRUITURL1 can be adjusted accordingly.

In another implementation, a content terminus 116 can define a selection of more than one content item, e.g., several web documents. Accordingly, the content items 114 associated with the content terminus 116 can be ranked higher in response to a search query considered in a search context associated with the content terminus 116 than when the query is considered absent of any context. For example, a statistically significant number of users can submit the queries "berries," "boysenberry," "blueberry," "strawberry," and "raspberry" during a search session, and then click through to the website defined by a first address, e.g., BERRYURL1, while another statistically significant set of users can submit the same queries and click through to a website defined by a second address, e.g., BERRYURL2. Thus the query path defined by the queries "berries/boysenberry/blueberry/strawberry/raspberry" or a permutation of the queries "berries/boysenberry/blueberry/strawberry/raspberry" can be associated with content terminus 116 that is, in turn, associated with the content items BERRYURL1 and BERRYURL2. Accordingly, if the contextual search engine 102 determines that the search session context is related to the query path "berries/boysenberry/blueberry/strawberry/raspberry," then the ranking of the content item BERRYURL1 and BERRYURL2 can be adjusted accordingly.

In one implementation, the ranking of the content items 114 associated with a content terminus 116 can be adjusted in proportional relation to the likelihood that the content items 114 will be selected. For example, assume 55% of the search sessions having a context associated with the query path "berries/boysenberry/blueberry/strawberry/raspberry" resulted in the selection of the content items BERRYURL1, and 35% of the search sessions having a context associated with the query path "berries/boysenberry/blueberry/strawberry/raspberry" resulted in the selection of the content items BERRYURL2. Based on this selection distribution, the contextual search engine 102 can, for example, rank the content item BERRYURL1 and BERRYURL2 first and second, respectively, in response to any of the queries berries, boysenberry, blueberry, strawberry, and raspberry submitted in a search session having a context that is identified as being related to the query path "berries/boysenberry/blueberry/strawberry/raspberry."

In another implementation, the contextual search engine 102 can identify a category for each of the query paths 110. For example, for the query path "orange/banana" contextual search engine 102 can identify this query path as a "fruit" category. In one implementation, the contextual search engine 102 can identify a search session category and can adjust content item rankings according to the identified search session category. In another implementation, the ranking adjustment can be based on both the identified context of a search session and the identified category of the search session. In another implementation, the contextual search engine 102 can, for example, eliminate from consideration query paths that do not fall into the identified category.

In another implementation, the contextual search engine 102 can identify a category for each content terminus 116. For example, for the query path defined by queries "orange/banana/strawberry" and associated with a content terminus, the contextual search engine 102 can identify the category "fruit" for the content terminus. In one implementation, the contextual search engine 102 can identify a search session category and can adjust content item rankings according to the identified search session category. For example, if a search session includes the queries apple, peach, and mango, the search session category may be identified as "fruit," and content items associated with the content terminus of the fruit category may be adjusted in rank. In this implementation, the search session context may not be readily associated with a query path associated with the content terminus, e.g., there are no common terms among the sets of apple/peach/mango and orange/banana/strawberry, but the content items associated with the search path orange/banana/strawberry may nevertheless be increased in rank based on the identified category.

Other ranking adjustment schemes based on query paths, search contexts, and search categories can also be used. For example, in another implementation, the contextual search engine 102 can decrease a ranking of one or more content items 114. In one implementation, the ranking of a content item 114 can be decreased if the ranking of the content item 114 is above a threshold but is rarely selected for an identified search context. For example, a particular content item 114 may be highly ranked, e.g., ranked first, for each of the queries "apple," "orange" and "banana" when the queries are considered in the absence of any context. However, if the content item 114 is rarely selected in response to the queries when the queries are considered in the context of the query path defined by the queries apple/orange/banana, then the ranking of the content item 114 can be reduced, e.g., from a first rank to a second rank, third rank, or an even lower rank.

Figure 2:
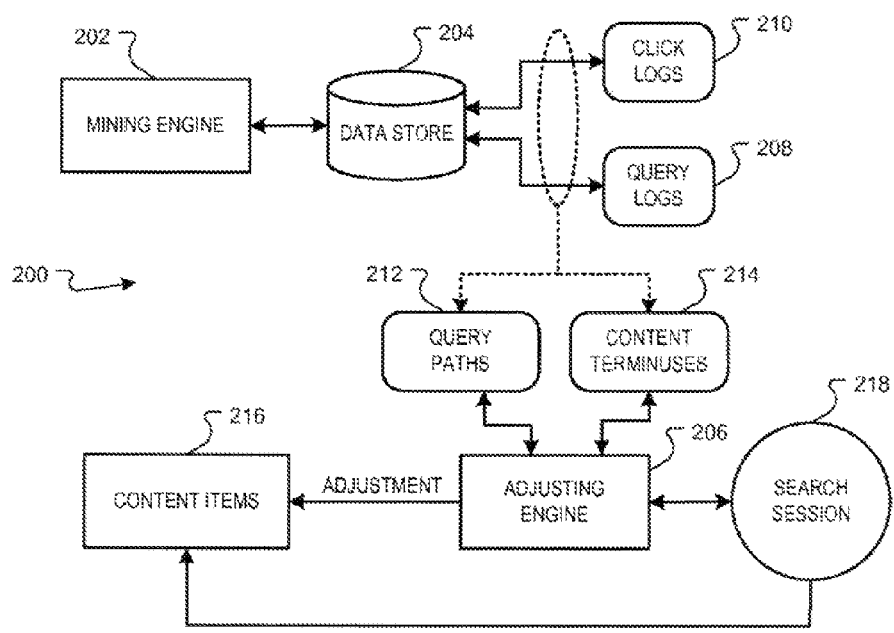
FIG. 2 is a block diagram of another example content identification system.

FIG. 2 is a block diagram of another example content identification system 200. The content identification system 200, can, for example, be implemented in a computer device or more than one computer devices connected through a network, e.g., a LAN or a WAN. Example computing devices are shown and described with reference to FIG. 12. Other implementations, however, can also be used.

The content identification system 200 can, for example, include a mining engine 202, a content data store 204, and an adjusting engine 206. In one implementation, the content data store 204 can comprise a unitary data store, such as a hard drive. In another implementation, the content data store 204 can comprise a distributed data store, such as a storage system that is distributed over a network. Other implementations, however, can also be used.

In one implementation the content data store 204 can store click logs 210 and query logs 208, and the mining engine 202 can mine the query logs 208 and click logs 210 to identify query paths associated with the selections of content items. Different types of query logs 208 and click logs 210 can be identified. In one implementation, the query logs 206 can store queries submitted by users, and the click logs 210 can define content items 216 retrieved in response to the queries.

In one implementation, the mining engine 202 can, for example, identify content terminuses 214 defined by the click logs 210 and identify query paths 212 defined by the query logs 208. The query paths 212 can, for example, be associated with a content item 216 by a content terminus 214, e.g., the terminus of a query path that corresponds to an eventual selection of a content item 216. In one implementation, the content terminus 214 can be implemented as a node association of one or more query paths 212 with one or more content items 216, e.g., web pages. In another implementation, the content terminus 214 can be a content item 216, e.g., a URL associated with a web document. Other implementations can also be used.

In one implementation, the mining engine 202 can, for example, identify a context of a search session. For example, a search context can be defined by multiple queries of a particular search session 218. The mining engine 202 can, for example, determine whether one or more queries of a search session relate to an identified query path 212. Accordingly, the content item 216 associated with the identified query path 212 and/or content terminus 214 can be ranked higher in response to a search query considered in the search context than when the query is considered absent of any context.

The content identification system 200 can, for example, implement some or all of the functions of the content identification system 100 of FIG. 1. For example, the mining engine 202 can identify query paths, context terminuses, and categories as described with respect to FIG. 1 above. Likewise, the adjusting engine 206 can increase or decrease the rankings of content items 216 according to an identified search session category, and/or an identified context of a search session. In one implementation, the mining engine 202 and the adjusting engine 206 can be integrated into a search engine. In another implementation, the mining engine 202 and the adjusting engine 206 can be in data communication with a search engine and adjust the search engine results accordingly. Other implementations can also be used, e.g., the adjusting engine 206 can include a search engine.

Figure 3:
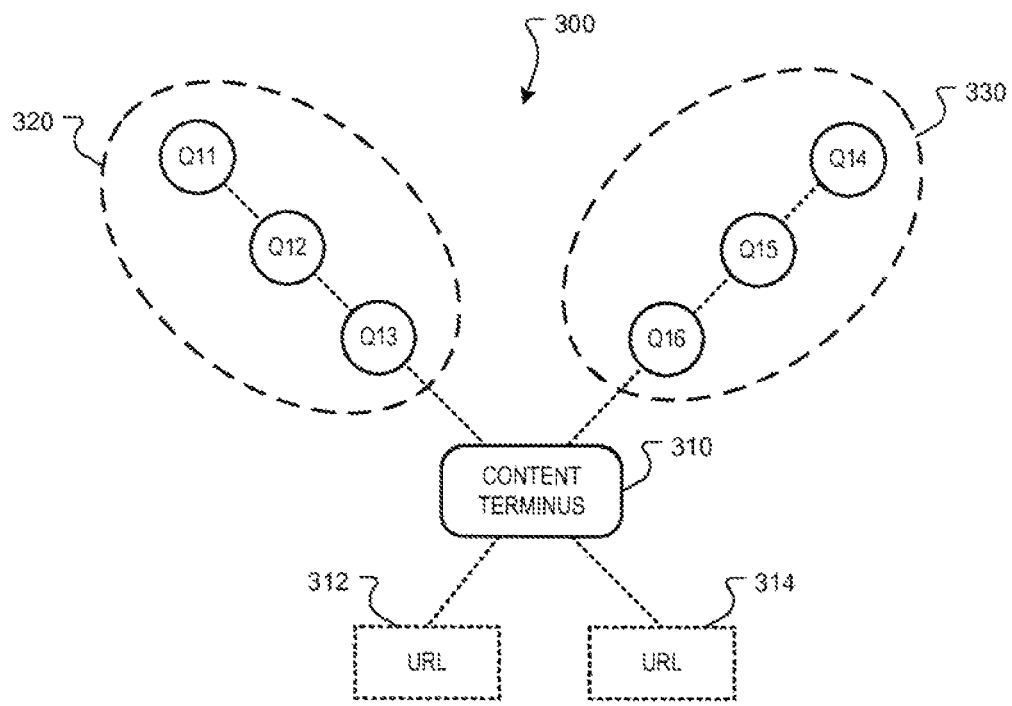
FIG. 3 is a block diagram of an association of one or more queries and content items.

FIG. 3 is a block diagram of an association 300 of one or more queries Q11, Q12, Q13, Q14, Q15 and Q16 and a content item 310. The association 300 illustrates the association of multiple query paths, e.g., query paths 320 and 330, with a content terminus 310. In one implementation, the content terminus 310 can, for example, be a content item, such as URL for a publisher web site, an ftp link, a network address, a data file, or some other content or content address.

In another implementation, illustrated by the dashed URLS 312 and 314, the content terminus 310 can define an association of the query paths 320 and 330 with multiple content items, e.g., the URLs 312 and 314. For example, statistically significant portions of users that have provided queries in the context of the query paths 320 and 330 may have eventually selected the URLs 312 and 314. Accordingly, the content terminus 310 is representative of the association of the query paths 320 and 330 with the content items defined by the URLs 312 and 314.

The queries Q11, Q12 and Q13, or permutations thereof, can define a first query path 320, and the queries Q14, Q15 and Q16, or permutations thereof, can define a second query path 330. A search session having queries in common with the query path 310, e.g., Q12 followed by Q11, or Q12 followed by Q13, or Q11 followed by Q13, for example, can be identified as having a context related to the query path 310.

In one implementation, a search session can be identified as having a context related to a query path only if all the queries of the search session define an exclusive union with the query path. For example, a search session defined by queries Q11, Q18 and Q13 would not be identified as having a context related to the query path 310; a search session defined only by two or more of the queries Q11, Q12 and Q13, however, would be identified as having a context related to the query path 310. In another implementation, a search session can be identified as having a context related to a query path if some of the queries of the search session define a union with the query path. For example, a search session defined by queries Q11, Q18 and Q12 would be identified as having a context related to the query path 310, despite the fact that the query Q18 is not included in the identified query path 310.

Figure 4:
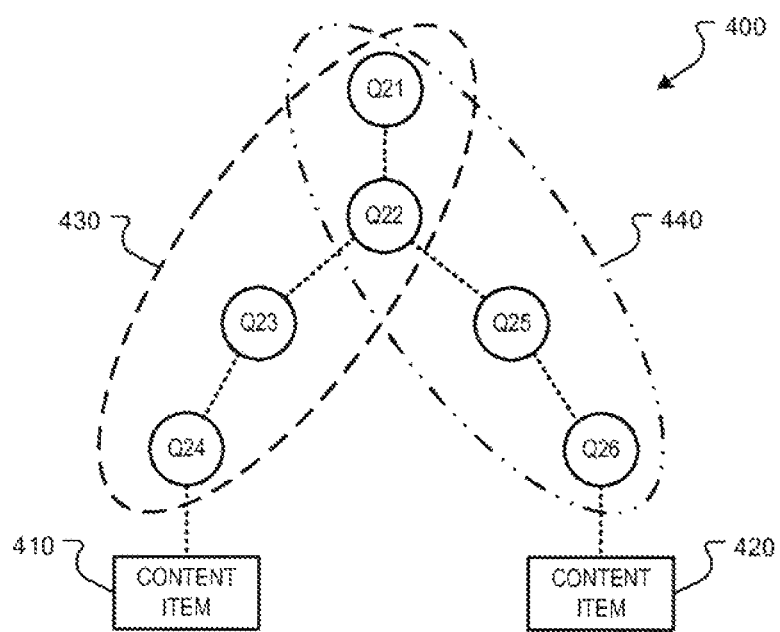
FIG. 4 is another block diagram of an association of one or more queries and content items.

FIG. 4 is another block diagram of an association 400 of one or more queries Q21, Q22, Q23, Q24, Q25 and Q26 and content items 410 and 420. The association 400 illustrates the association of query paths having common queries e.g., first and second query paths 430 and 440 and queries Q21 and Q22. The queries Q21, Q22, Q23 and Q24, or permutations thereof can, for example, define the first query path 430, and the queries Q21, Q22, Q25 and Q26, or permutations thereof can, for example, define the second query path 440.

In one implementation, a search session can be identified as having a context related to a query path only if all of the queries of the search session define an exclusive union with a query path. For example, a search session defined by queries Q21 and Q22 would be identified as having a context related to the query paths 430 and 440; likewise, a search session defined by queries Q21, Q25, and Q22 would be identified as having a context related to the query path 440. In another implementation, a search session can be identified as having a context related to a query path if some of the queries of the search path, e.g., a search session defined by queries Q21, Q23 and Q26 can be identified as having a context related to both of the query paths 410 and 420.

Figure 5:
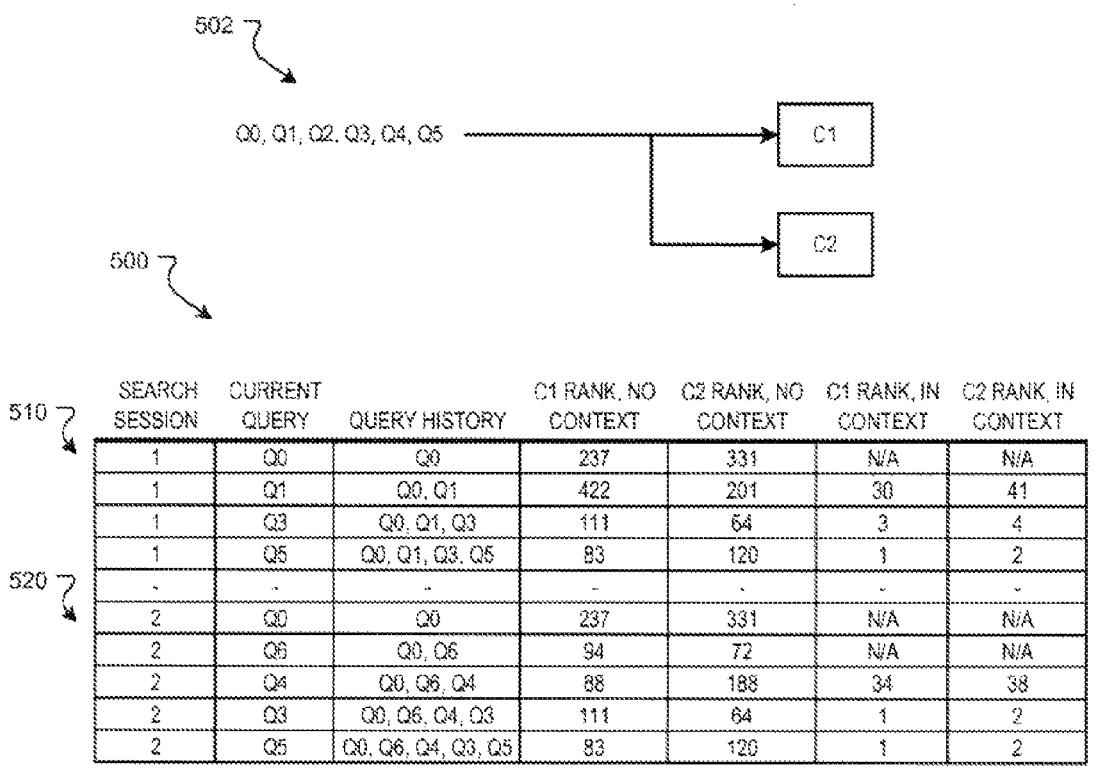
FIG. 5 is an example query and ranking table.

FIG. 5 is an example query and ranking table 500. The query and ranking table 500 illustrates different ranking adjustments for an example query path 502 defined by the queries Q0, Q1, Q2, Q3, Q4 and Q5 associated with two content items C1 and C2.

As shown in the query and ranking table 500, queries Q0, Q1, Q3 and Q5 are received during a first search session 510. For the first query Q0, the content items C1 and C2 are, for example, respectively ranked 237 and 331 in a list of search results for the query Q0 absent any context. Because the query Q0 alone may not identify a particular context, the rankings of the content items C1 and C2 are not adjusted.

For the second query Q1, the content items C1 and C2 are, for example, respectively ranked 237 and 331 in a list of search results for the query Q1 absent any context. However, the queries Q1 and Q0 can, for example, define a context related to the query path 502. Accordingly, the rankings of the content items C1 and C2 can be adjusted, e.g., the content items can be respectively ranked 30 and 41.

For the third query Q3, the content items C1 and C2 are, for example, respectively ranked 111 and 64 in a list of search results for the query Q3 absent any context. However, the queries Q3, Q1 and Q0 can, for example, define the context related to the query path 502. Accordingly, the rankings of the content items C1 and C2 can be adjusted, e.g., the content items can be respectively ranked 3 and 4.

For the fourth query Q5, the content items C1 and C2 are, for example, respectively ranked 83 and 120 in a list of search results for the query Q5 absent any context. However, the queries Q5, Q3, Q1 and Q0 can, for example, define the context related to the query path 502. Accordingly, the rankings of the content items C1 and C2 can be adjusted, e.g., the content items can be respectively ranked 1 and 2.

Likewise, queries Q0, Q6, Q4, Q3 and Q5 are received during a second search session 520. For the first query Q0, the content items C1 and C2 are, for example, respectively ranked 237 and 331 in a list of search results for the query Q0 absent any context. Because the query Q0 alone may not identify a particular context, the rankings of the content items C1 and C2 are not adjusted.

For the second query Q6, the content items C1 and C2 are, for example, respectively ranked 94 and 72 in a list of search results for the query Q1 absent any context. Because the queries Q0 and Q6 may not identify a particular context, the rankings of the content items C1 and C2 are not adjusted.

For the third query Q4, the content items C1 and C2 are, for example, respectively ranked 88 and 188 in a list of search results for the query Q4 absent any context. However, the queries Q4 and Q0 can, for example, define the context related to the query path 502. Accordingly, the rankings of the content items C1 and C2 can be adjusted, e.g., the content items can be respectively ranked 34 and 38.

For the fourth query Q3, the content items C1 and C2 are, for example, respectively ranked 111 and 64 in a list of search results for the query Q3 absent any context. However, the queries Q4, Q3 and Q0 can, for example, define the context related to the query path 502. Accordingly, the rankings of the content items C1 and C2 can be adjusted, e.g., the content items can be respectively ranked 1 and 2. Finally, the fifth query Q5 results in a similarly adjusted ranking.

Figure 6:
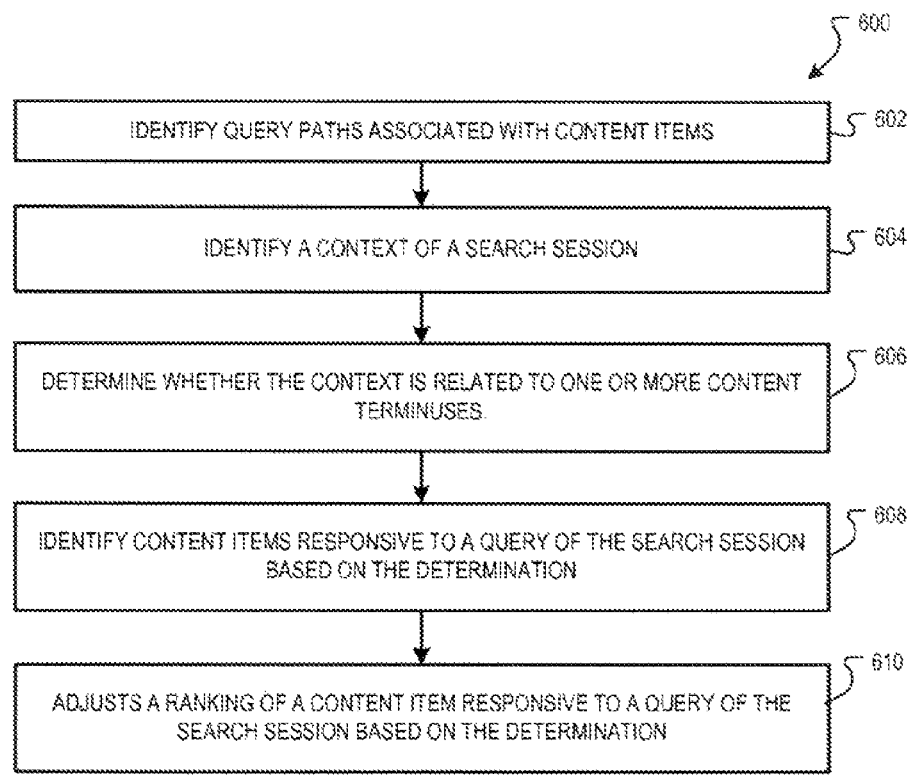
FIG. 6 is a flow diagram of an example process for identifying content items.

FIG. 6 is a flow diagram of an example process 600 for identifying content items. The process 600 can, for example, be implemented in a system such as the content identification system 100 of FIG. 1 and/or the content identification system 200 of FIG. 2.

Stage 602 identifies query paths associated with content items. For example, the contextual search engine 102 or the mining engine 202 can identify query paths associated with content items.

Stage 604 identifies a context of a search session. For example, the contextual search engine 102 or the mining engine 202 can identify a context of a search session by comparing queries of the search session to identified query paths. In one implementation, query terms of a search session can be compared to the queries defining an identified query path for an exact match. In another implementation, query terms of a search session can be compared to the queries defining an identified query path to determine a degree of similarity, e.g., the term "apple" could be determined to have no similarity to the term "brown bear," while the term "grizzly bear" could be determined to have a high degree of similarity to the term "brown bear."

Stage 606 determines whether the context is related to one or more query paths. For example, the contextual search engine 102 or the mining engine 202 can determine whether the context is related to one or more query paths based on an exclusive union of query terms of the search session with an identified query path, or a union of some of the query terms of the search session with an identified query path, or a percentage of similar query terms, or based on some other determination.

Stage 608 identifies content items responsive to a query of the search session based on the determination. For example, the contextual search engine 102 or the adjusting engine 206 can identify content items responsive to a query of a search session based on the determination of whether the context is related to one or more query paths, e.g., the relevance of content items responsive to the query in the context of an associated query path may be increased or decreased.

Stage 610 adjusts a ranking of a content item responsive to a query of the search session based on the determination. For example, the contextual search engine 102 or the adjusting engine 206 can adjust a ranking of a content item based on the determination of whether the context is related to one or more query paths.

Figure 7:
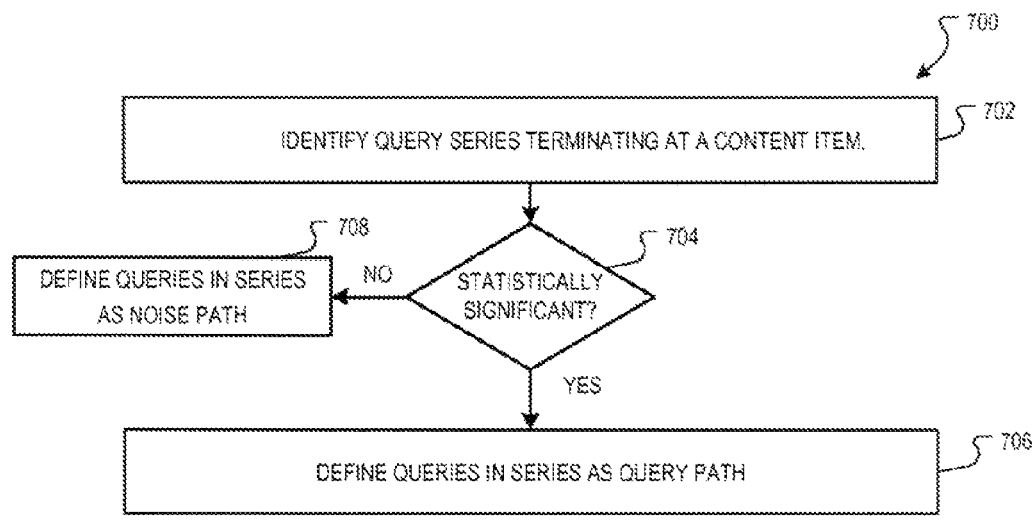
FIG. 7 is a flow diagram of an example process for identifying query paths.

FIG. 7 is a flow diagram of an example process 700 identifying query paths. The process 700 can, for example, be implemented in a system such as the content identification system 100 of FIG. 1 and/or the content identification system 200 of FIG. 2.

Stage 702 identifies query series terminating at a content item. For example, the contextual search engine 102 or the mining engine 202 can identify a series of queries that resulted in a selection of a content item based on an analysis of click logs and query logs.

Stage 704 determines whether the series of queries is statistically significant. For example, the contextual search engine 102 or the mining engine 202 can determine whether the series of queries is statistically significant if a threshold percentage of search sessions, e.g., 10%, include the same or similar query series that preceded a selection of the content item.

Upon a positive determination from stage 704, stage 706 defines the series of queries as a query path. For example, the contextual search engine 102 or the mining engine 202 can define a query path based on the series of queries of a permutation thereof.

Conversely, upon a negative determination from stage 704, stage 708 defines the series of queries as a noise path, e.g. a statistically insignificant query series. For example, the contextual search engine 102 or the mining engine 202 can define the series of queries as a noise path.

Figure 8:
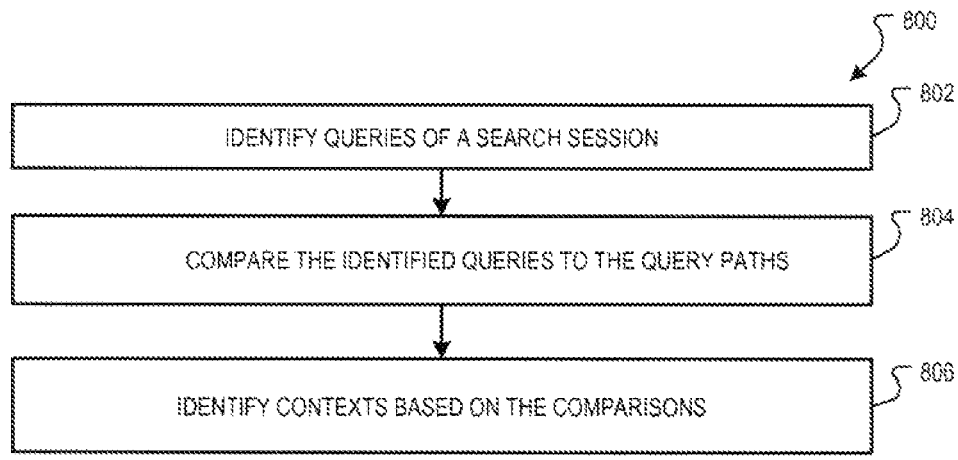
FIG. 8 is a flow diagram of an example process for identifying a search session context.

FIG. 8 is a flow diagram of an example process 800 for identifying a search session context. The process 800 can, for example, be implemented in a system such as the content identification system 100 of FIG. 1 and/or the content identification system 200 of FIG. 2.

Stage 802 identifies queries in a search session. For example, the contextual search engine 102 or the mining engine 202 can identify queries of a search session, e.g., by storing queries received from a client over a network.

Stage 804 compares the identified queries to query paths. For example, the contextual search engine 102 or the mining engine 202 can compare the stored queries to the identified query paths.

Stage 806 identifies contexts based on the comparison. For example, the contextual search engine 102 or the mining engine 202 can determine that the search session can be in the context of one or more query paths based on a non-exclusive union, or an exclusive union, or on some other basis.

Figure 9:
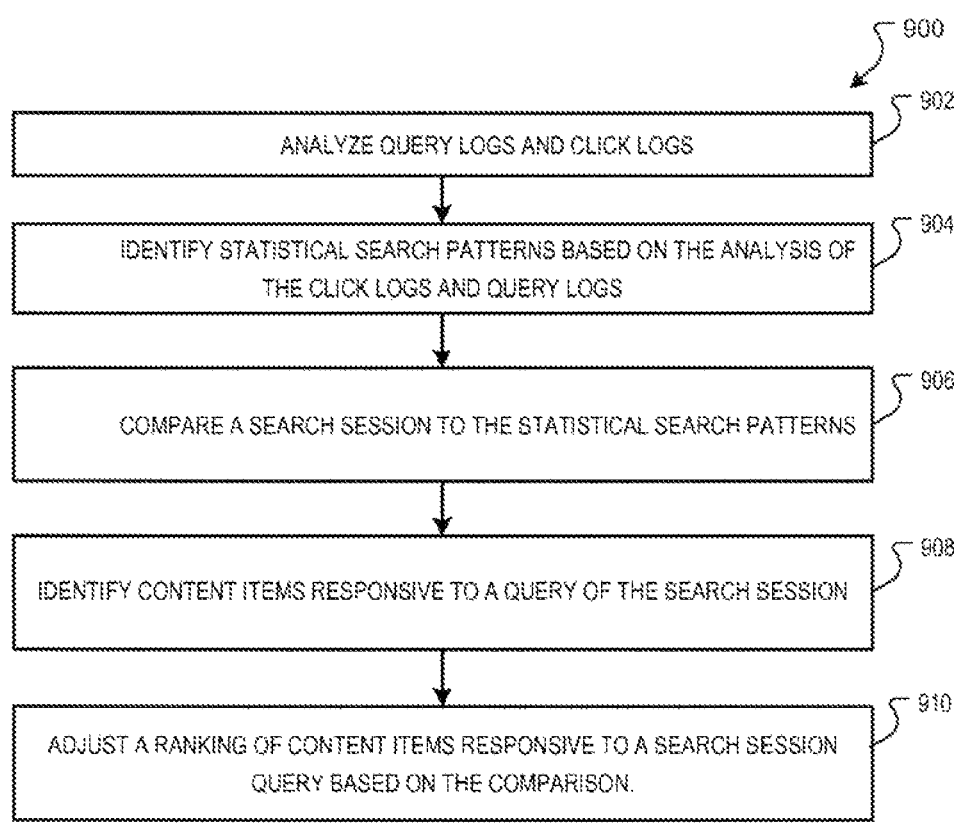
FIG. 9 is a flow diagram of an example process for identifying content items.

FIG. 9 is a flow diagram of an example process 900 for identifying content items. The process 900 can, for example, be implemented in a system such as the content identification system 100 of FIG. 1 and/or the content identification system 200 of FIG. 2.

Stage 902 analyzes query logs and click logs. For example, the contextual search engine 102 or the mining engine 202 can analyze query logs and click logs.

Stage 904 identifies statistical search patterns based on the analysis of the click logs and query logs. For example, the contextual search engine 102 or the mining engine 202 can identify statistically significant search patterns, e.g., query paths, based on the analysis of the query logs and click logs.

Stage 906 compares a search session to the statistical search patterns. For example, the contextual search engine 102 or the mining engine 202 can compare a search session to the statistical search patterns.

Stage 908 identifies content items responsive to a query of the search session. For example, the contextual search engine 102 or the adjusting engine 206 can identify content items responsive to a query of the search session. Stage 910 adjusts a ranking of content items responsive to a search session query based on the comparison. For example, the contextual search engine 102 or the adjusting engine 206 can adjust a ranking of content items responsive to a search session query based on the comparison.

Figure 10:
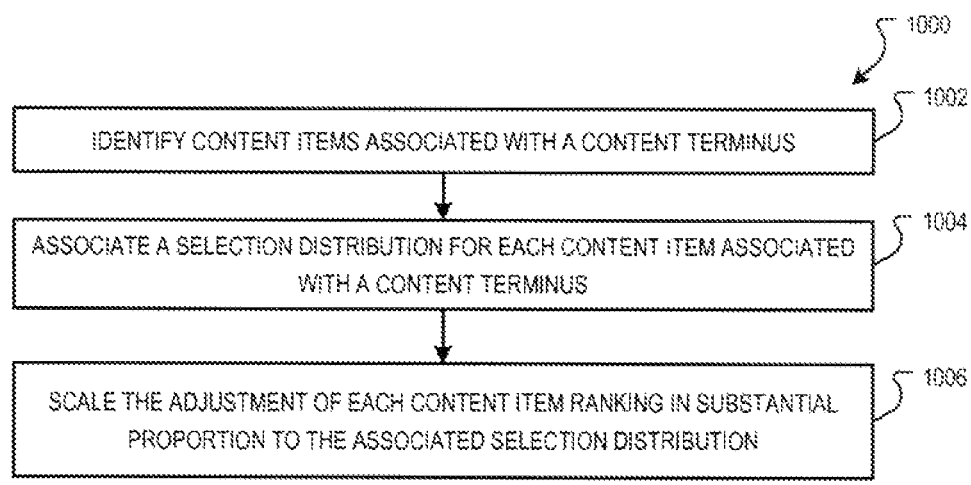
FIG. 10 is a flow diagram of an example process for scaling a ranking adjustment.

FIG. 10 is a flow diagram of an example process 1000 for scaling a ranking adjustment. The process 1000 can, for example, be implemented in a system such as the content identification system 100 of FIG. 1 and/or the content identification system 200 of FIG. 2.

Stage 1002 identifies content items associated with a content terminus. For example, the contextual search engine 102 or the mining engine 202 can identify content items associated with a content terminus.

Stage 1004 associates a selection distribution for each content item associated with a content terminus. For example, the contextual search engine 102 or the mining engine 202 can associate a selection distribution for each content item associated with a content terminus.

Stage 1006 scales the adjustment of each content item ranking, in one implementation, in substantial proportion to the associated selection distribution. For example, the contextual search engine 102 or the mining engine 202 can scale the adjustment of each content item ranking in substantial proportion to the associated selection distribution, e.g., a content item with a selection distribution of 40% may be scaled more that a content item was a selection distribution of 5%.

Figure 11:
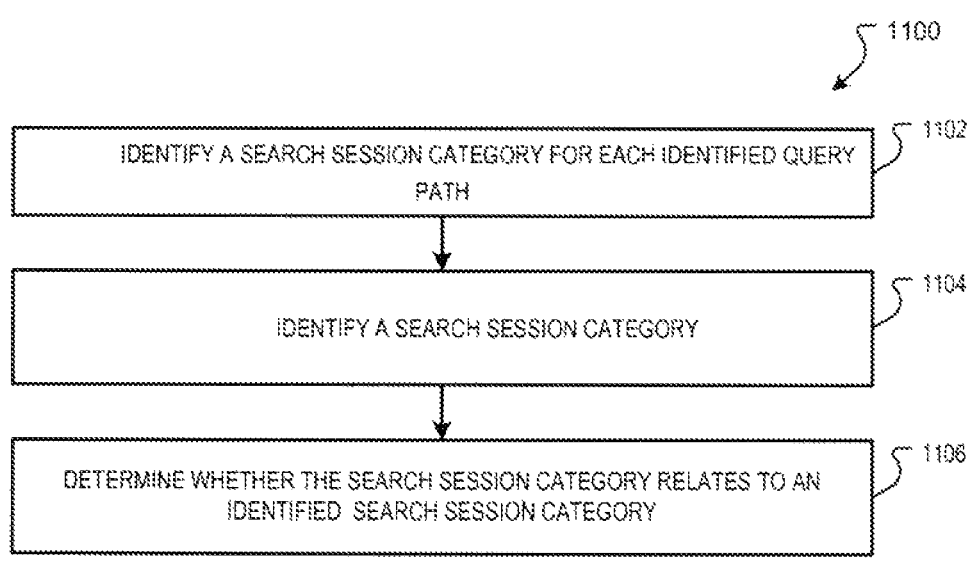
FIG. 11 is a flow diagram of an example process of identifying content items based on a search session category.

FIG. 11 is a flow diagram of an example process 1100 of identifying content items based on a search session category. The process 1100 can, for example, be implemented in a system such as the content identification system 100 of FIG. 1 and/or the content identification system 200 of FIG. 2.

Stage 1102 identifies a search session category for each identified query path. For example, the contextual search engine 102 or the mining engine 202 can identify a search session category for each of the query paths, e.g., by evaluating the query keywords and content associated with a content terminus or content item. For example, a query path may have an identified category of "extreme sports" if the queries and associated content include subjects such as "base jumping," "rock climbing," etc.

Stage 1104 identifies a current search session category. For example, the contextual search engine 102 or the mining engine 202 can identify a search session category of a current search session by comparing queries of the current search session to the queries of an identified query path; if the queries of the current search session are common to the queries of an identified query path, then the search session category can be identified as the same category of the identified query path. In another implementation, the search terms of the query of the current search session can be processed to identify a category. Other identification techniques can also be used.

Stage 1106 determines whether the current search session category relates to an identified search session category. For example, the contextual search engine 102 or the mining engine 202 can determine whether the current search session category relates to an identified previous search session category, e.g., either by an exact relationship or a similar relationship. For example, the category of "sports" may be determined to be of a similar relationship to "extreme sports."

In one implementation, adjustments of content item rankings can be scaled according to the identified relation. For example, if the current search session category relates exactly to a category of an identified query path, content items associated with the identified query path can be adjusted to a maximum degree, e.g., a rank may be increased by an order of magnitude, or by a certain value, or to a value that ensures that the content item will be displayed on a first display page to a user. Conversely, if the current search session category is only similarly related to a category of an identified query path, content items associated with the identified query path can be adjusted to a lesser, e.g., minimum, degree. Other adjustment schemes can also be used.

Figure 12:
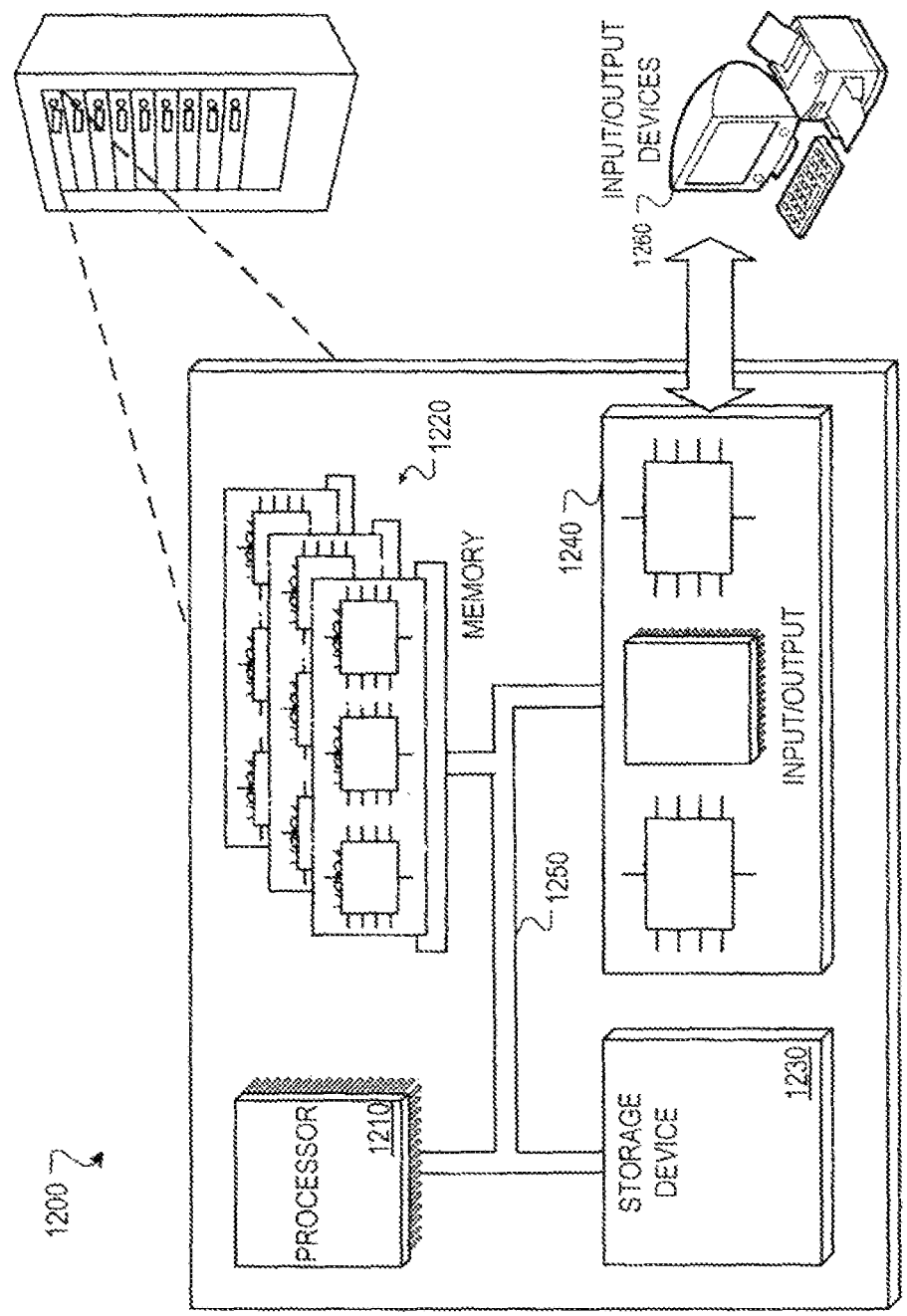
FIG. 12 is a schematic diagram of an example computer system that can be utilized to implement the systems and methods described herein.

FIG. 12 is block diagram of an example computer system 1200. The system 1200 includes a processor 1212, a memory 1220, a storage device 1230, and an input/output device 1240. Each of the components 1212, 1220, 1230, and 1240 can, for example, be interconnected using a system bus 1250. The processor 1212 is capable of processing instructions for execution within the system 1200. In one implementation, the processor 1212 is a single-threaded processor. In another implementation, the processor 1212 is a multi-threaded processor. The processor 1212 is capable of processing instructions stored in the memory 1220 or on the storage device 1230.

The memory 1220 stores information within the system 1200. In one implementation, the memory 1220 is a computer-readable medium. In one implementation, the memory 1220 is a volatile memory unit. In another implementation, the memory 1220 is a non-volatile memory unit.

The storage device 1230 is capable of providing mass storage for the system 1200. In one implementation, the storage device 1230 is a computer-readable medium. In various different implementations, the storage device 1230 can, for example, include a hard disk device, an optical disk device, or some other large capacity storage device.

The input/output device 1240 provides input/output operations for the system 1200. In one implementation, the input/output device 1240 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 1260.

Queries can, for example, be received from client devices that can be implemented on computer systems similar to the computer system 1200 of FIG. 12. Other implementations, however, can also be used, such as mobile computing devices, mobile communication devices, set-top box television client devices, etc.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
 identifying query paths from previous search sessions, each query path defining a context and being a plurality of queries in an order in which the queries were provided for in a respective previous search session;
 identifying search session queries of a current search session;
 comparing the search session queries of the current search session to the queries in the query paths from the previous search sessions; and
 determining, by one or more data processors, that a context of the current search session is related to a query path from the previous search sessions based at least in part on the comparison, the determining comprising:
  determining that two or more of the queries of the query path from the previous search sessions are similar to two or more of the search session queries of the current search session.

2. The method of claim 1, wherein:
 determining that two or more of the queries of the query path from the previous search sessions are similar to two or more of the search session queries of the current search session comprises:
 identifying a union of the two or more of the queries of the query path from the previous search sessions and the two or more of the search session queries of the current search session.

3. The method of claim 2 wherein:
 determining that two or more of the queries of the query path from the previous search sessions are similar to two or more of the search session queries of the current search session comprises:
 determining that the context of the current search session is related to a query path from the previous search sessions if the identified union is an exclusive union.

4. The method of claim 1, further comprising:
 identifying content items responsive to a search session query of the current search session based on the determination that the context of the current search session is related to the query path from the previous search sessions.

5. The method of claim 4, wherein:
 identifying content items responsive to the search session query of the current search session based on the determination comprises:
 adjusting a ranking of a content item responsive to the search session query of the current search session based on the determination.

6. The method of claim 1, wherein identifying the query paths from the previous search sessions comprises:
analyzing click log and query log data to identify similar or same sets of queries from the previous search sessions during which a presentation of a same content item also occurred.

7. The method of claim 6, wherein the same content item is a web page.

8. A computer-readable storage medium having instructions stored thereon, which, when executed by one or more data processors, cause the one or more processor to perform operations comprising:
identifying query paths from previous search sessions, each query path defining a context and being a plurality of queries in an order in which the queries were provided for in a respective previous search session;
identifying search session queries of a current search session;
comparing the search session queries of the current search session to the queries in the query paths from the previous search sessions; and
determining that a context of the current search session is related to a query path from the previous search sessions based at least in part on the comparison, the determining comprising:
determining that two or more of the queries of the query path from the previous search sessions are similar to two or more of the search session queries of the current search session.

9. The medium of claim 8, wherein:
determining that two or more of the queries of the query path from the previous search sessions are similar to two or more of the search session queries of the current search session comprises:
identifying a union of the two or more of the queries of the query path from the previous search sessions and the two or more of the search session queries of the current search session.

10. The medium of claim 9, wherein:
determining that two or more of the queries of the query path from the previous search sessions are similar to two or more of the search session queries of the current search session comprises:
determining that the context of the current search session is related to a query path from the previous search sessions if the identified union is an exclusive union.

11. The medium of claim 8, wherein the instructions, which, when executed by the one or more data processors, cause the one or more processor to perform further operations comprising:
identifying content items responsive to a search session query of the current search session based on the determination that the context of the current search session is related to the query path from the previous search sessions.

12. The medium of claim 11, wherein:
identifying content items responsive to the search session query of the current search session based on the determination comprises:
adjusting a ranking of a content item responsive to the search session query of the current search session based on the determination.

13. The medium of claim 8, wherein identifying the query paths from the previous search sessions comprises:
analyzing click log and query log data to identify similar or same sets of queries from the previous search sessions during which a presentation of a same content item also occurred.

14. The medium of claim 13, wherein the same content item is a web page.

15. A system comprising:
one or more data processing apparatuses; and
a data storage apparatus encoded with instructions that when executed by the one or more data processing apparatuses cause the one or more data processing apparatuses to perform operations comprising:
identifying query paths from previous search sessions, each query path defining a context and being a plurality of queries in an order in which the queries were provided for in a respective previous search session;
identifying search session queries of a current search session;
comparing the search session queries of the current search session to the queries in the query paths from the previous search sessions; and
determining that a context of the current search session is related to a query path from the previous search sessions based at least in part on the comparison, the determining comprising:
determining that two or more of the queries of the query path from the previous search sessions are similar to two or more of the search session queries of the current search session.

16. The system of claim 15, wherein:
determining that two or more of the queries of the query path from the previous search sessions are similar to two or more of the search session queries of the current search session comprises:
identifying a union of the two or more of the queries of the query path from the previous search sessions and the two or more of the search session queries of the current search session.

17. The system of claim 16, wherein:
determining that two or more of the queries of the query path from the previous search sessions are similar to two or more of the search session queries of the current search session comprises:
determining that the context of the current search session is related to a query path from the previous search sessions if the identified union is an exclusive union.

18. The system of claim 15, wherein the instructions, which, when executed by the one or more data processors, cause the one or more processor to perform further operations comprising:
identifying content items responsive to a search session query of the current search session based on the determination that the context of the current search session is related to the query path from the previous search sessions.

19. The system of claim 18, wherein:
identifying content items responsive to the search session query of the current search session based on the determination comprises:
adjusting a ranking of a content item responsive to the search session query of the current search session based on the determination.

20. The system of claim 15, wherein identifying the query paths from the previous search sessions comprises:

analyzing click log and query log data to identify similar or same sets of queries from the previous search sessions during which a presentation of a same content item also occurred.

* * * * *